US008214315B2

(12) United States Patent
Hangartner et al.

(10) Patent No.: US 8,214,315 B2
(45) Date of Patent: *Jul. 3, 2012

(54) SYSTEMS AND METHODS FOR PRIORITIZING MOBILE MEDIA PLAYER FILES

(75) Inventors: Rick Hangartner, Corvallis, OR (US); Francisco Martin, Covallis, OR (US); David Del Ser Bartolome, Madrid (ES); Guillermo Caudevilla-Laliena, Huesca (ES); Matt McLaughlin, Corvallis, OR (US); Craig Rowley, Corvallis, OR (US); Andrew Yip, Corvallis, OR (US); Jim Shur, Corvallis, OR (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/167,500

(22) Filed: Jun. 23, 2011
(Under 37 CFR 1.47)

(65) Prior Publication Data

US 2011/0251995 A1    Oct. 13, 2011

Related U.S. Application Data

(63) Continuation of application No. 12/783,739, filed on May 20, 2010, now Pat. No. 7,987,148, which is a continuation of application No. 11/674,028, filed on Feb. 12, 2007, now Pat. No. 7,743,009.

(60) Provisional application No. 60/772,957, filed on Feb. 13, 2006, provisional application No. 60/772,147, filed on Feb. 10, 2006.

(51) Int. Cl.
*G06F 17/10* (2006.01)
*G06F 17/30* (2006.01)

(52) U.S. Cl. ............ 706/46; 706/20; 707/621
(58) Field of Classification Search ............ 706/46
See application file for complete search history.

(56) References Cited

U.S. PATENT DOCUMENTS 5,355,302 A   10/1994   Martin
5,375,235 A   12/1994   Berry
5,464,946 A   11/1995   Lewis
(Continued)

FOREIGN PATENT DOCUMENTS

CN    1 231 788 A1   8/2002
(Continued)

OTHER PUBLICATIONS

Tom Bunzel, "Easy Digital Music," QUE Publisher, Aug. 18, 2004, Chapters 5 and 8.
(Continued)

*Primary Examiner* — Alan Chen
*Assistant Examiner* — Nathan Brown, Jr.
(74) *Attorney, Agent, or Firm* — Novak Druce + Quigg LLP

(57) ABSTRACT

Disclosed are embodiments of systems and methods for prioritizing mobile media player files by providing for the automated addition and/or deletion of media items for a mobile media player. In some embodiments, a statistical method may be provided for inferring which media items on a mobile media player should be deleted based on, for example, user taste data. In some embodiments, new media items may be loaded onto a user's mobile media player by creating one or more playlists from a playlist builder. The playlist(s) may be created by using user taste data. Rankings may also be created to determine an order for deletion of the media items currently on a mobile media player and/or for addition of new media items to the device.

20 Claims, 4 Drawing Sheets

U.S. PATENT DOCUMENTS

| | | | |
|---|---|---|---|
| 5,483,278 A | 1/1996 | Strubbe | |
| 5,583,763 A | 12/1996 | Atcheson | |
| 5,724,521 A | 3/1998 | Dedrick | |
| 5,754,939 A | 5/1998 | Herz | |
| 5,758,257 A | 5/1998 | Herz | |
| 5,765,144 A | 6/1998 | Larche | |
| 5,890,152 A | 3/1999 | Rapaport | |
| 5,918,014 A | 6/1999 | Robinson | |
| 5,950,176 A | 9/1999 | Keiser | |
| 6,000,044 A | 12/1999 | Chrysos | |
| 6,047,311 A | 4/2000 | Ueno | |
| 6,112,186 A | 8/2000 | Bergh | |
| 6,134,532 A | 10/2000 | Lazarus | |
| 6,345,288 B1 | 2/2002 | Reed | |
| 6,346,951 B1 | 2/2002 | Mastronardi | |
| 6,347,313 B1 | 2/2002 | Ma | |
| 6,349,339 B1 | 2/2002 | Williams | |
| 6,381,575 B1 | 4/2002 | Martin | |
| 6,430,539 B1 | 8/2002 | Lazarus | |
| 6,434,621 B1 | 8/2002 | Pezzillo | |
| 6,438,579 B1 | 8/2002 | Hosken | |
| 6,487,539 B1 | 11/2002 | Aggarwal | |
| 6,526,411 B1 | 2/2003 | Ward | 707/102 |
| 6,532,469 B1 | 3/2003 | Feldman | |
| 6,577,716 B1 | 6/2003 | Minter | |
| 6,587,127 B1 | 7/2003 | Leeke | |
| 6,615,208 B1 | 9/2003 | Behrens | |
| 6,647,371 B2 | 11/2003 | Shinohara | |
| 6,687,696 B2 | 2/2004 | Hofmann | |
| 6,690,918 B2 | 2/2004 | Evans | |
| 6,704,576 B1 | 3/2004 | Brachman | |
| 6,748,395 B1 | 6/2004 | Picker | |
| 6,751,574 B2 | 6/2004 | Shinohara | |
| 6,785,688 B2 | 8/2004 | Abajjan | |
| 6,842,761 B2 | 1/2005 | Diamond | |
| 6,850,252 B1 | 2/2005 | Hoffberg | |
| 6,914,891 B2 | 7/2005 | Ha et al. | |
| 6,931,454 B2 | 8/2005 | Deshpande | |
| 6,933,433 B1 | 8/2005 | Porteus | |
| 6,941,324 B2 | 9/2005 | Plastina | |
| 6,947,922 B1 | 9/2005 | Glance | |
| 6,950,804 B2 | 9/2005 | Strietzel | |
| 6,987,221 B2 | 1/2006 | Platt | |
| 6,990,497 B2 | 1/2006 | O'Rourke | |
| 6,993,532 B1 | 1/2006 | Platt et al. | 707/102 |
| 7,013,238 B1 | 3/2006 | Weare | |
| 7,020,637 B2 | 3/2006 | Bratton | |
| 7,021,836 B2 | 4/2006 | Braiton | |
| 7,043,479 B2 | 5/2006 | Ireton | |
| 7,051,352 B1 | 5/2006 | Schaffer | |
| 7,072,846 B1 | 7/2006 | Robinson | |
| 7,082,407 B1 | 7/2006 | Bezos | |
| 7,096,234 B2 | 8/2006 | Plastina | |
| 7,111,240 B2 | 9/2006 | Crow | |
| 7,113,917 B2 | 9/2006 | Jacobi | |
| 7,113,999 B2 | 9/2006 | Pestoni | |
| 7,120,619 B2 | 10/2006 | Drucker | |
| 7,127,143 B2 | 10/2006 | Elkins | |
| 7,136,866 B2 | 11/2006 | Springer, Jr. | |
| 7,139,723 B2 | 11/2006 | Conkwright | |
| 7,180,473 B2 | 2/2007 | Horie | |
| 7,194,421 B2 | 3/2007 | Conkwright | |
| 7,197,472 B2 | 3/2007 | Conkwright | |
| 7,236,941 B2 | 6/2007 | Conkwright | |
| 7,256,341 B2 | 8/2007 | Plastina | |
| 7,302,419 B2 | 11/2007 | Conkwright | |
| 7,358,434 B2 | 4/2008 | Plastina | |
| 7,363,314 B2 | 4/2008 | Picker | |
| 7,392,212 B2 | 6/2008 | Hancock | |
| 7,403,769 B2 | 7/2008 | Kopra | |
| 7,415,181 B2 | 8/2008 | Greenwood | |
| 7,434,247 B2 | 10/2008 | Dudkiewicz | |
| 7,457,862 B2 | 11/2008 | Hepworth | |
| 7,478,323 B2 | 1/2009 | Dowdy | |
| 7,490,775 B2 | 2/2009 | Biderman | |
| 7,493,572 B2 | 2/2009 | Card | |
| 7,499,630 B2 | 3/2009 | Koch | |
| 7,505,959 B2 | 3/2009 | Kaiser | |
| 7,546,254 B2 | 6/2009 | Bednarek | |
| 7,568,213 B2 | 7/2009 | Carhart | |
| 7,574,422 B2 | 8/2009 | Guan | |
| 7,574,513 B2 | 8/2009 | Dunning | |
| 7,580,932 B2 | 8/2009 | Plastina | |
| 7,599,950 B2 | 10/2009 | Walther | |
| 7,644,077 B2 | 1/2010 | Picker | |
| 7,657,224 B2 | 2/2010 | Goldberg | |
| 7,707,603 B2 | 4/2010 | Abanami | |
| 7,734,569 B2 | 6/2010 | Martin | |
| 7,831,199 B2 | 11/2010 | Ng | |
| 7,875,788 B2 | 1/2011 | Benyamin | |
| 2001/0007099 A1 | 7/2001 | Rau | |
| 2001/0056434 A1 | 12/2001 | Kaplan | |
| 2002/0002899 A1 | 1/2002 | Gjerdingen | |
| 2002/0042912 A1 | 4/2002 | Iijima | |
| 2002/0059094 A1 | 5/2002 | Hosea | |
| 2002/0082901 A1 | 6/2002 | Dunning et al. | 706/102 |
| 2002/0152117 A1 | 10/2002 | Cristofalo et al. | |
| 2002/0178223 A1 | 11/2002 | Bushkin | |
| 2002/0178276 A1 | 11/2002 | McCartney | |
| 2002/0194215 A1 | 12/2002 | Cantrell | |
| 2003/0033321 A1 | 2/2003 | Schrempp | |
| 2003/0055689 A1 | 3/2003 | Block | |
| 2003/0120630 A1 | 6/2003 | Tunkelang | |
| 2003/0212710 A1 | 11/2003 | Guy | |
| 2003/0220100 A1 | 11/2003 | McElhatten et al. | 455/418 |
| 2003/0221541 A1 | 12/2003 | Platt | 84/609 |
| 2003/0229537 A1 | 12/2003 | Dunning et al. | |
| 2004/0002993 A1 | 1/2004 | Toussaint | |
| 2004/0003392 A1 | 1/2004 | Trajkovic | |
| 2004/0068552 A1 | 4/2004 | Kotz | |
| 2004/0073924 A1 | 4/2004 | Pendakur | |
| 2004/0128286 A1 | 7/2004 | Yasushi et al. | |
| 2004/0139064 A1 | 7/2004 | Chevallier | |
| 2004/0148424 A1 | 7/2004 | Berkson | |
| 2004/0158860 A1 | 8/2004 | Crow | |
| 2004/0162738 A1 | 8/2004 | Sanders | |
| 2004/0194128 A1 | 9/2004 | McIntyre | |
| 2004/0263337 A1 | 12/2004 | Terauchi et al. | |
| 2004/0267715 A1 | 12/2004 | Polson et al. | |
| 2005/0021470 A1 | 1/2005 | Martin et al. | 705/51 |
| 2005/0060350 A1 | 3/2005 | Baum | |
| 2005/0075908 A1 | 4/2005 | Stevens | |
| 2005/0091146 A1 | 4/2005 | Levinson | |
| 2005/0102610 A1 | 5/2005 | Jie | |
| 2005/0114357 A1 | 5/2005 | Chengalvarayan | |
| 2005/0131752 A1 | 6/2005 | Gracie | |
| 2005/0141709 A1 | 6/2005 | Bratton | |
| 2005/0154608 A1 | 7/2005 | Paulson | |
| 2005/0160458 A1 | 7/2005 | Baumgartner | |
| 2005/0193014 A1 | 9/2005 | Prince | |
| 2005/0193054 A1 | 9/2005 | Wilson | |
| 2005/0195696 A1 | 9/2005 | Rekimoto | |
| 2005/0203807 A1 | 9/2005 | Bezos et al. | |
| 2005/0210009 A1 | 9/2005 | Tran | |
| 2005/0210101 A1 | 9/2005 | Janik | 709/203 |
| 2005/0216855 A1 | 9/2005 | Kopra | |
| 2005/0216859 A1 | 9/2005 | Paek | |
| 2005/0222989 A1 | 10/2005 | Haveliwala | |
| 2005/0223039 A1 | 10/2005 | Kim | |
| 2005/0234891 A1 | 10/2005 | Walther | |
| 2005/0235811 A1 | 10/2005 | Dukane | 64/612 |
| 2005/0251440 A1 | 11/2005 | Bednarek | |
| 2005/0256867 A1 | 11/2005 | Walther | |
| 2005/0276570 A1 | 12/2005 | Reed | |
| 2006/0015571 A1 | 1/2006 | Fukuda et al. | |
| 2006/0015904 A1 | 1/2006 | Marcus | |
| 2006/0018208 A1 | 1/2006 | Nathan | |
| 2006/0018209 A1 | 1/2006 | Darkoulis | |
| 2006/0020062 A1 | 1/2006 | Bloom | |
| 2006/0026263 A1 | 2/2006 | Raghavan et al. | |
| 2006/0053077 A1 | 3/2006 | Mourad | |
| 2006/0062094 A1 | 3/2006 | Nathan | |
| 2006/0067296 A1 | 3/2006 | Bershad | |
| 2006/0074750 A1 | 4/2006 | Clark | |
| 2006/0080251 A1 | 4/2006 | Fried | |
| 2006/0080356 A1 | 4/2006 | Burges | |
| 2006/0091203 A1 | 5/2006 | Bakker | |

| | | | |
|---|---|---|---|
| 2006/0095516 A1 | 5/2006 | Wijeratne | |
| 2006/0100978 A1 | 5/2006 | Heller et al. | 70/71 |
| 2006/0112098 A1 | 5/2006 | Renshaw | |
| 2006/0123052 A1 | 6/2006 | Robbin | |
| 2006/0136344 A1 | 6/2006 | Jones | |
| 2006/0143236 A1 | 6/2006 | Wu | 707/104.1 |
| 2006/0168616 A1 | 7/2006 | Candelore | |
| 2006/0173910 A1 | 8/2006 | McLaughlin | |
| 2006/0173916 A1 | 8/2006 | Verbeck | |
| 2006/0174008 A1 | 8/2006 | Abanami | |
| 2006/0195462 A1 | 8/2006 | Rogers | |
| 2006/0195513 A1 | 8/2006 | Rogers | |
| 2006/0195514 A1 | 8/2006 | Rogers | |
| 2006/0195515 A1 | 8/2006 | Beaupre | |
| 2006/0195516 A1 | 8/2006 | Beaupre | |
| 2006/0195521 A1 | 8/2006 | New | |
| 2006/0195789 A1 | 8/2006 | Rogers | |
| 2006/0195790 A1 | 8/2006 | Beaupre | |
| 2006/0253874 A1 | 11/2006 | Stark | |
| 2006/0265421 A1 | 11/2006 | Ranasinghe | |
| 2006/0277098 A1 | 12/2006 | Chung | |
| 2006/0282311 A1 | 12/2006 | Jiang | |
| 2006/0288044 A1 | 12/2006 | Kashiwagi | |
| 2006/0288367 A1 | 12/2006 | Swix | |
| 2007/0016507 A1 | 1/2007 | Tzara | |
| 2007/0043829 A1 | 2/2007 | Dua | |
| 2007/0073596 A1 | 3/2007 | Alexander | |
| 2007/0100690 A1 | 5/2007 | Hopkins | |
| 2007/0101373 A1 | 5/2007 | Bodlanender | |
| 2007/0118546 A1 | 5/2007 | Acharya | |
| 2007/0136264 A1 | 6/2007 | Tran | |
| 2007/0156677 A1 | 7/2007 | Szabo | |
| 2007/0203790 A1 | 8/2007 | Torrens | |
| 2007/0244880 A1 | 10/2007 | Martin | |
| 2007/0250429 A1 | 10/2007 | Walser | |
| 2007/0250761 A1 | 10/2007 | Bradley | |
| 2007/0271266 A1 | 11/2007 | Purang et al. | |
| 2007/0294096 A1 | 12/2007 | Randall | |
| 2008/0004948 A1 | 1/2008 | Flake | |
| 2008/0004990 A1 | 1/2008 | Flake | |
| 2008/0027881 A1 | 1/2008 | Bisse | |
| 2008/0046317 A1 | 2/2008 | Christianson | |
| 2008/0077264 A1 | 3/2008 | Irvin | |
| 2008/0082467 A1 | 4/2008 | Meijer | |
| 2008/0109378 A1 | 5/2008 | Papadimitriou | |
| 2008/0133601 A1 | 6/2008 | Martin Cervera et al. | |
| 2008/0155057 A1 | 6/2008 | Khedouri | |
| 2008/0155588 A1 | 6/2008 | Roberts | |
| 2008/0195438 A1 | 8/2008 | Manfredi | |
| 2008/0220855 A1 | 9/2008 | Chen | |
| 2008/0270221 A1 | 10/2008 | Clemens | |
| 2009/0024504 A1 | 1/2009 | Lerman | |
| 2009/0024510 A1 | 1/2009 | Chen | |
| 2009/0048957 A1 | 2/2009 | Celano | |
| 2009/0073174 A1 | 3/2009 | Berg | |
| 2009/0076939 A1 | 3/2009 | Berg | |
| 2009/0076974 A1 | 3/2009 | Berg | |
| 2009/0083307 A1 | 3/2009 | Martin Cervera et al. | |
| 2009/0089222 A1 | 4/2009 | Ferreira | |
| 2009/0106085 A1 | 4/2009 | Raimbeault | |
| 2009/0210415 A1 | 8/2009 | Martin | |
| 2009/0276368 A1 | 11/2009 | Martin | |
| 2010/0161595 A1 | 6/2010 | Martin | |
| 2010/0169328 A1 | 7/2010 | Hangartner | |

FOREIGN PATENT DOCUMENTS

| | | |
|---|---|---|
| EP | 1 050 833 | 8/2000 |
| EP | 1420388 A1 | 5/2004 |
| EP | 1 548 741 A1 | 6/2005 |
| JP | 11052965 | 2/1999 |
| JP | 2002108351 | 4/2002 |
| JP | 2002320203 A | 10/2002 |
| JP | 2003255958 | 10/2003 |
| JP | 2004221999 A | 8/2004 |
| JP | 2005027337 A | 1/2005 |
| KR | 2002025579 A | 4/2002 |
| WO | WO 03/036541 A1 | 5/2003 |
| WO | WO03051051 A1 | 6/2003 |
| WO | WO2004070538 | 8/2004 |
| WO | WO2005013114 A1 | 2/2005 |
| WO | WO 2005/115107 A2 | 12/2005 |
| WO | WO2006052837 | 5/2006 |
| WO | WO2006075032 | 7/2006 |
| WO | WO2006114451 | 11/2006 |
| WO | WO 2007/038806 A3 | 4/2007 |
| WO | WO2007134193 | 5/2007 |
| WO | WO2007075622 | 7/2007 |
| WO | WO2007092053 | 8/2007 |
| WO | WO20090149048 A1 | 12/2009 |

OTHER PUBLICATIONS

PCT/US07/068708; Filed May 10, 2007; International Search Report and Written Opinion; WO 2007/134193; Dec. 7, 2007.

Stolowitz Ford Cowger LLP, List of Related Cases, May 20, 2010.

Chao-Ming et al. (Chao-Ming), Design and Evaluation of mProducer: a Mobile Authoring Tool for Personal Experience Computing [online], MUM 2004, College Park, Maryland, USA, Oct. 27-29, 2004 [retrieved on Dec. 17, 2010]. [http://citeseerx.ist.psu.edu/viewdoc/download?doI=10.1.1.131.2933&rep=rep1&type=pdf].

Strands Business Solutions. "Integration Document v.2.0"; Published May 2008; [online retrieved on Jan. 21, 2010] Retrieved from the internet <URL: http://recommender.strands.com/doc/SBS-Integration-Document.pdf>: entire document—18 pages.

PCT/US09/68604 International Search Report and Written Opinion of the International Searching Authority; dated Feb. 17, 2010.

John Thompson, "A Graphic Representation of Interaction With the NEXIS News Database," MIT Thesis (May 1983).

Lippman, et al., "News and Movies in the 50 Megabit Living Room," IEEE/IEICE, Global Telecommunications Conference, pp. 1976-1981 (Nov. 15, 1987).

Bender, et al., "Newspace: Mass Media and Personal Computing," Proceedings of USENIX, Conference, pp. 329-346 (Summer 1991).

Lie, "The Electronic Broadsheet—All the News That Fits the Display," MIT Master's Thesis, pp. 1-96 (Jun. 1991).

Jonathan L. Orwant, "Doppeiganger: A User Modeling System," MIT Bachelor's Thesis (Jun. 1991).

"Lessons from LyricTimeTM: A Prototype Multimedia System" 4th IEEE ComSoc International Workshop on Multimedia Communications (Apr. 1992).

Belkins, et al., "Information Filtering and Information Retrieval: Two Sides of the Same Coin?", Communications of the ACM (Dec. 1992).

Architecting Personalized Delivery of Multimedia Information,: Communications of the ACM (Dec. 1992).

Jonathan L Orwant, "Doppelganger Goes to School: Machine Learning for User Modeling," MIT Master of Science Thesis (Sep. 1993).

Jon Orwant, "Appraising the User of User Models: Doppelganger's Interface," in: A. Kobsa and D. Litman (eds.), Proceeding of the 4th International Conference on User Modeling (1994).

Bender, "Twenty Years of Personalization: All about the Daily Me," Educause Review (Sep./Oct. 2002).

PCT/ES2005/00003 Written Opinion of the International Searching Authority Report dated Jun. 10, 2005.

PCT/ES2005/000213 Written Opinion of the International Searching Authority dated Jan. 12, 2006.

PCT/ES2005/00003 Written Opinion of the International Preliminary Examining Authority dated Mar. 19, 2007.

PCT/ES2005/00003 International Preliminary Report on Patentability (Ch II) Report dated May 22, 2007.

PCT/ES2005/000213 International Preliminary Report on Patentability (Ch II) Report Dated Nov. 15, 2007.

ShopSmart: Product Recommendations through Technical Specifications and User Reviews; Alexander Yates et al. Temple University; CIKM; Oct. 26-30, 2006, Napa Valley, CA, USA; 2 pages.

"Communications of the ACM" Dec. 1992, vol. 35, No. 12 at pp. 26-28 (Introduction to special issue regarding Workshop on High Performance Information Filtering, Morristown, N.J. Nov. 1991).

Delivering Interactive Multimedia Documents over Networks: Shoshana Loeb: IEEE Communications Magazine; May 1992; 8 pages.

PolyLens: A Recommender System for Groups of Users; M. O'Connor, D. Cosley, J.A. Konstan, J, Riedl; European Conference on Computer Supported Co-Operative Work at Bonn, Germany; Published 2001; pp. 199-218.

Toward alernative metrics of journal impact: a comparison of download and citation data, Johan Bollen, Herbert Van de Sompel, Joan Smith, Rick Luce, Google.com, 2005, pp. 1-2.

Apple: iTunes 4.2 User Guide for Windows; Dec. 2003; retrieved from the Internet: URL: http://www2.austin.cc.tx.us/tcm/projects/itunes.pdf; pp. 10, 17-19. (Added Ref Nov. 5, 2009).

Incremental tensor analysis: theory and applications, Jimeng Sun, Dacheng Tao, Spiros Papadimitriou, Philip Yu, Christos Faloutsos, ACM, Oct. 2008, pp. 1-37.

PCT/US2007/09/45725; International Search Report_WO; Jul. 15, 2009.

PCT/US2006/004257 European Search Report Oct. 23, 2009.

Augmenting the Social Space of an Academic Conference; McCarthy, et al. Information School, University of Washington and Department of Computer Science and Engineering, University of Minnesota; pp. 1-10; Nov. 6-10, 2004.

Baluja, S., Seth, R., Sivakumar, D., Jing, Y., Yagnik, J., Kumar, S., Ravichandran, D., and Aly, M. "Video Suggestion and Discovery for YouTube: Taking Random Walks Through the View Graph". In WWW '08: Proceedings of the 17th international conference on World Wide Web, pp. 895-904, Beijing, China, 2006. ACM Press.

Carlson et al. "Internet Banking Market Developments and Regulatory Issues in the New Economy: What Changed, and the Challenges for Economic Policy . . . "; May 2001; http://www.occ.gov/netbank/SGEC2000.pdf.

Co-Construction of Hybrid Spaces; Asa Rudsirom; A Dissertation submitted to the University of Stockholm in partial fulfillment of the requirements for the Degree of Doctor of Philosophy; Department of Computer and Systems Sciences Stockholm University and Royal institute of Technology; pp. 1-69; Nov. 2005.

Das,A., Datar,M., Garg,A., and Rajaram,S. "Google News Personalization: Scalable Online Collaborative Filtering". In WWW '07: Proceedings of the 16th international conference on World Wide Web, pp. 271-280, New York, NY, USA, 2007. ACM Press.

Dean, J. and Ghemawat, S. "MapReduce: Simplied Data Processing on Large Clusters". Commun. ACM, 51(1):107-113, 2008.

Dempster, Y., Laird, N., and Rubin, D. "Maximum Likelihood from Incomplete Data via the EM Algorithm". Jour. of the Royal Stat. Soc., Ser. B., 39:1047-1053, 1977.

Hofmann, T. "Latent Semantic Models for Collaborative Filtering". ACM Transactions on Information Systems, 22:89-115, 2004.

Hofmann, T. "Unsupervised Learning by Probabilistic Latent Semantic Analysis". Mach. Learn., 42:177-196, 2001.

Industry Standard, The, Help FAQs for Standard Prediction Market http://www.thestandard.com/help, downloaded Jun. 29, 2009.

Indyk, P. and Matousek, J. "Low-Distortion Embeddings of Finite Metric Spaces". In Handbook of Discrete and Computational Geometry, pp. 177-196. CRC Press, 2004.

International Search Report PCT/US2009/051233; Sep. 4, 2009; Strands, Inc.

IP City, Integrated Project on Interaction and Presence on Urban Environments-Demonstrators on Large-Scale Events Applications; ipcity.eu; Giulio Jacucci, John Evans, Tommi Ilmonen; pp. 1-37; Feb. 9, 2007.

Lazar, N.A.; Bayesian Empirical Likelihood; Technical Report, Carnegi Mellon University, Department of Statistics, 2000; 26 pages.

MobiLenin—Combining a Multi-Track Music Video, Personal Mobile Phones and a Public Display into Multi-User Interactive Entertainment; Jurgen Scheible, et al. Media Lab, University of Art and Design, Helsinki, Finland; pp. 1-10; Nov. 6-10, 2005.

PCT/US09/42002; Filed Apr. 28, 2009; International Search Report and Written Opinion; Jun. 2009.

PCT/US09145911; Filed Jun. 2, 2009; International Search Report and Written Opinion.

PCT/US2007/068708; International Search Report; May 10, 2007.

Scihira, I. "A Characterization of Singular Graphs". Electronic Journal of Linear Algebra, 16:451-462, 2007.

Toward University Mobile Interaction for Shared Displays; Tim Paek, et al.; Microsoft Research, Redmond, WA; pp. 1-4; Nov. 6-10, 2004.

Trustees of Indiana University, Variations2, The Indiana University Digital Music Library, http://dmi.indiana.edu/, last updated May 11, 2005.

Wolfers, Justin and Zitzewitz, Eric, Prediction Markets, Journal of Economic Perspectives, Spring 2004, pp. 107-126, vol. 18, No. 2.

Yen, Yi-Wyn, Apple announces a 32GB iPhone 3G by Jun. 15, 2009, The Industry Standard, Apr. 2, 2009, http://www.thestandard.com/preditions/channel/hardware, downloaded Apr. 8, 2009.

N.A. Lazar; Bayesian Empirical Likelihood; Technical Report, Carnegi Mellon University, Department of Statistics, 2000; 26 pages.

S. Baluja, R. Seth, D. Sivakumar, Y. Jing, J. Yagnik, S. Kumar, D. Ravichandran, and M. Aly, "Video Suggestion and Discovery for YouTube: Taking Random Walks Through the View Graph". In WWW '08: Proceedings of the 17th international conference on World Wide Web, pp. 895-904, Beijing, China, 2008. ACM Press.

A. Das, M. Datar, A. Garg, and S. Rajaram. "Google News Personalization: Scalable Online Collaborative Filtering". In WWW '07: Proceedings of the 16th international conference on World Wide Web, pp. 271-280, New York, NY, USA, 2007. ACM Press.

J. Dean and S. Ghemawat, "MapReduce: Simplied Data Processing on Large Clusters". Commun. ACM, 51 (1):107-113, 2008.

Y. Dempster, N. Laird, and D. Rubin. "Maximum Likelihood from Incomplete Data via the EM Algorithm". Jour. of the Royal Stat. Soc., Ser. B., 39:1047-1053, 1977.

T. Hofmann. "Unsupervised Learning by Probabilistic Latent Semantic Analysis". Mach. Learn., 42:177-196, 2001.

T. Hofmann. "Latent Semantic Models for Collaborative Filtering". ACM Transactions on Information Systems, 22:89-115, 2004.

P. Indyk and J. Matousek. "Low-Distortion Embeddings of Finite Metric Spaces". In Handbook of Discrete and Computational Geometry, pp. 177-196. CRC Press, 2004.

I. Scihira. "A Characterization of Singular Graphs". Electronic Journal of Linear Algebra, 16:451-462, 2007.

PCT/US2006/034218; International Search Authority; PCT International Search Report; Feb. 9, 2007.

PCT/US06/38769; International Search Report; Mar. 25, 2008.

PCT/US06/48330; International Bureau; PCT Search Report and Written Opinion; Mar. 20, 2008.

PCT/US2006/003795; International Search Report and Written Opinion; May 28, 2008.

Alvear, Jose, "Risk-Free Trial Streaming Media Delivery Tools,"0 Streaming Media.com; www.streamingmedia.com/articie.ap?id=5768, Jun. 30, 2000.

Deshpande, Mukund, et al., "Item-Based Top-N Recommendation Algoriths," ACM Transactions on Information Systems, 22:1 (Jan. 2004), pp. 143-177.

Pachet, Francois, A Taxonomy of Musical Genres, Content-Based Multimedia Information Access Conference (RIAO), Paris, Apr. 2000, 8 pages.

Platt, John C. et al., "Learning a Gaussian Process Prior for Automatically Generating Music Playiists," Microsoft Corporation (platt, cburgess, sswenson, ohriswea)@microsoft.com, aloez@cs.berkeley.edu, pp. 1-9.

Platt, John S., "Fasting Embedding of Sparse Music Similarity Graphs," Microsoft Corporation, {iplatt@microsoft.com).

Smart Computing, "The Scoop on File-Sharing Services," Dec. 2000, vol. 11, Issue 12; pp. 30-33 in printed issue. Available at www.smartcomputing.com/editorial/article.asp?article=articles%2F2000%Fs1112%2F08s12.asp.

www.akoo.com/Akoo/, Web Page, AKOO, Pick the Music, Waiting in the line at the Theme Park, Introducing the m-Venue™ platform.

www.axcessnews.com/modules/wfsection/article.php?articleid=8327, Web Page, Feb. 24, 2006, Maintenance FEES, Digital Music Sales Triple to $1.1 Billion in 2005.

www.bmi.com/news/200403/20040324b.asp, Web Page, BMI™ Figures Don't Lie, Mar. 24, 2004, Touch Tunes Signs License Agreement for BMI Music in Digital Jukeboxes.

www.ecastinc.com/music_licensing.html, Web Page, ECAST Network, interactive entertainment network, Music/Licensing.

www.rfidjournal.com/article/articleview/1619/1/1, Web Page, RFID brings messages to Seattle side walks on RFID system being deployed next week will send marketing and assistive information to users carrying active RFID tags. RFID Journal (pp. 1-4).

www.roweinternational.com/jukeboxes_dia.html, Web Page, Digital Internet Access Jukeboxes, Rowe International.

www.touchtunes.com, Web Page, Touchtunes, Turn your ROWE 100A's and 100B's into touch tunes Digital Jukeboxes—BOSE.

www.alwayson-network.com/comments.php?id=P12663 0 37 0 C, Web Page, Not Your Average Jukebox, On Hollywood 1000 contender Ecast uses broadbank to being the digital media experience to your watering hole.

Cano, Pedro et al., On the Use of FastMap for Audio Retrieval and Browsing, The International Conference on Music Information Retrieval and Related Activities (ISMIR 2002), Paris, France, Oct. 2002, 2 pages.

Connell, Iain et al., Ontological Sketch Models: Highlighting User-System Misfits, In P. Palanque, E. O'Neill and P. Johnson, editors, Proceedings of Human Computer Interaction (HCI) Bath, England, Sep. 2003, London Springer, pp. 1-16.

The Trustees of Indiana University, Variations2, The Indiana University Digital Music Library, http://dml.indiana.edu/, last updated May 11, 2005, 1 page.

Logan, Beth, Content-Based Playlist Generation: Exploratory Experiments, The international Conference on Music Information Retrieval and Related Activities (ISMIR 2002), Paris, France, Oct. 2002, 2 pages.

Logan, Beth et al., A Music Similarity Function Based on Signal Analysis, IEEE International Conference on Multimedia and Expo (ICME), Tokyo, Japan, Aug. 2001, IEEE Press, pp. 952-955.

Maidin, Donncha O et al., The Best of Two Worlds: Retrieving and Browsing, Proceedings of the COST G-6 Conference on Digital Audio Effects (DAFX-00), Verona, Italy, Dec. 7-9, 2000, 4 pages.

Notess, Mark at al., Variations2: Toward Visual Interface for Digital Music Libraries, Second international Workshop on Visual Interfaces to Digital Libraries, 2002, 6 pages.

Pampalk, Elias et al., Content-based Organization and Visualization of Music Archives, ACM Multimedia, Juan les Pins, France, Dec. 2002, pp. 570-579.

Pauws, Steffen et al., PATS: Realization and User Evaluation of an Automatic Playlist Generator, The International Conferences on Music Information Retrieval and Related Activities (ISMIR 2002), Paris, France, Oct. 2002, 9 pages.

Rauber, Andreas et al., The SOM-enhanced JukeBox: Organization and Visualization of Music Collections Based on Perceptual Models, Journal of New Music Research, vol. 32, Nov. 2, 2003, pp. 193-210.

Shneiderman, Ben, Tree Visualization with Tree-Maps: 2-d Space-Filling Approach, ACM Transactions on Graphics, vol. 11, No. 1, Jan. 1992, pp. 92-99.

Treermap, University of Maryland, http://www.os.umd.edu/hcil/treemap/, last udpated Aug. 5, 2003, 4 pages.

Shneiderman, Ben, Treemaps for Space-Contrained Visualization of Hierarchies, http://www.sc.umd.edu/heil/treemap-history/, last updated Apr. 28, 2006, 16 pages.

Tzanetakis, George et al., MARSYAS3D: A Prototype Audio Browser-Editor Using a Large Scale Immersive Visual and Audio Display, Proceedings of the 2001 International Conference on Auditory Display, Espoo, Finland, Jul./Aug. 2001, 5 pages.

"New Music Recommendation System is Based on FOAF Personal Profiling," www.masternewmedia.org/music_recommendation/music_recommendation_system_FOAF, Oct. 1, 2005.

"Social Networking Meets Music Listening: Mecora Launches Radio 2.0," www.masternewmedia.org/news/2006/04/13/social_networking_meets_music_listening.htm, Apr. 13, 2006.

SYSTEMS AND METHODS FOR PRIORITIZING MOBILE MEDIA PLAYER FILES

RELATED APPLICATIONS

This application is a continuation of co-pending U.S. patent application Ser. No. 12/783,739 filed May 20, 2010, titled "Systems and Methods for Prioritizing Mobile Media Player Files." This application claims the benefit under 35 U.S.C. §119(e) of U.S. Non-Provisional patent application Ser. No. 11/674,028 filed Feb. 12, 2007, titled "Systems and Methods for Prioritizing Mobile Media Player Files." This application claims the benefit under 35 U.S.C. §119(e) of U.S. Provisional Patent Application No. 60/772,957 filed Feb. 13, 2006, and titled "Auto-Filling a Mobile Media Playback Device." This application also claims the benefit under 35 U.S.C. §119(e) of U.S. Provisional Patent Application No. 60/772,147 filed Feb. 10, 2006, and titled "Freeing Space for New Media Items on a Mobile Media Playback Device Based on Inferred User Taste." The four aforementioned patent applications are incorporated herein by specific reference.

BRIEF DESCRIPTION OF THE DRAWINGS

Understanding that drawings depict only certain preferred embodiments of the invention and are therefore not to be considered limiting of its scope, the preferred embodiments will be described and explained with additional specificity and detail through the use of the accompanying drawings in which.

DETAILED DESCRIPTION OF PREFERRED EMBODIMENTS

Figure 1:
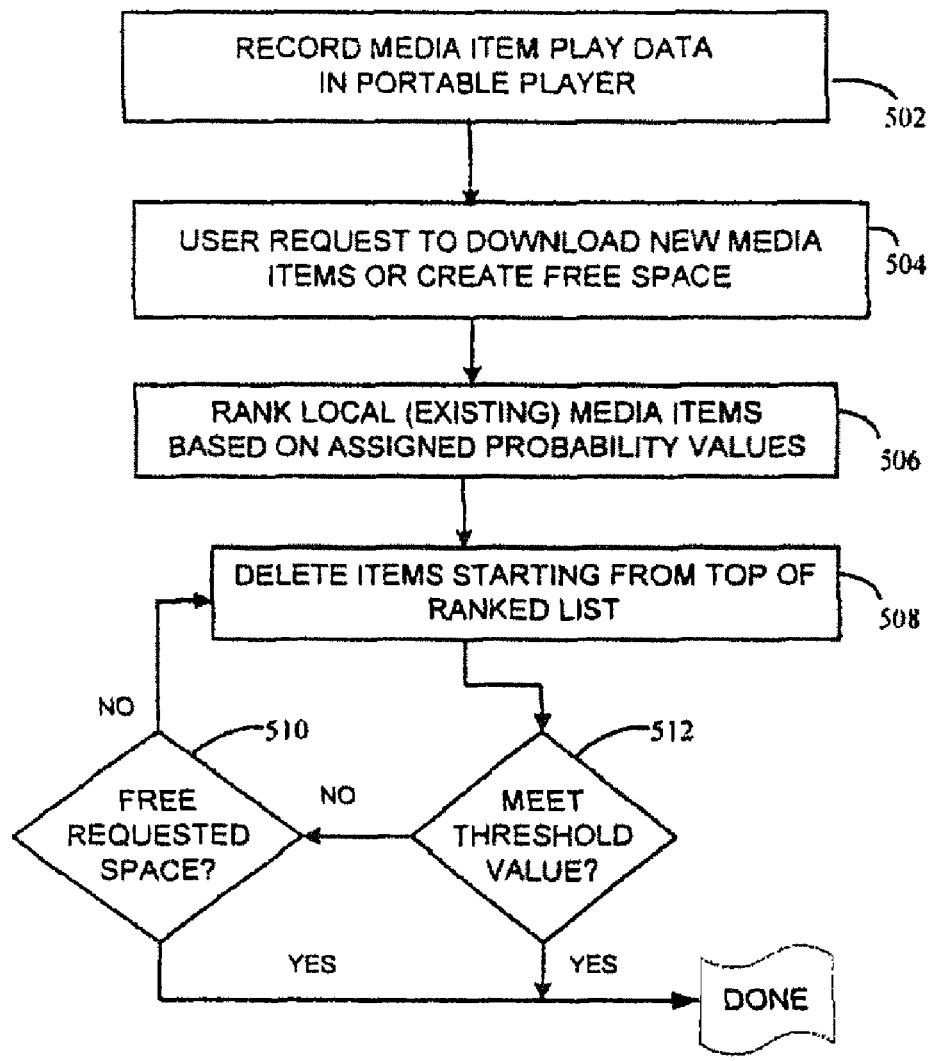
FIG. 1 is a flowchart of one embodiment of a method for the automated deletion of media items from a portable media player.

In the following description, certain specific details of programming, software modules, user selections, network transactions, database queries, database structures, etc., are provided for a thorough understanding of the specific preferred embodiments of the invention. However, those skilled in the art will recognize that embodiments can be practiced without one or more of the specific details, or with other methods, components, materials, etc.

In some cases, well-known structures, materials, or operations are not shown or described in detail in order to avoid obscuring aspects of the preferred embodiments. Furthermore, the described features, structures, or characteristics may be combined in any suitable manner in a variety of alternative embodiments. In some embodiments, the methodologies and systems described herein may be carried out using one or more digital processors, such as the types of microprocessors that are commonly found in PC's, laptops, PDA's and all manner of other desktop or portable electronic appliances.

Disclosed are embodiments of systems and methods for prioritizing mobile media player files. Some embodiments of the invention may provide systems and methods for automated deletion of files, such as media items, from a mobile media player. In some embodiments, a statistical method may be provided for inferring which media items on a mobile media player should be deleted based upon, for example, user taste data. Deletion of these files provides free space for new media items to be placed on the media player. One or more user taste parameters, intended playback scenarios, and/or explicitly specified user preferences may be combined to rank items from highest to lowest deletion priority to meet a required space constraint.

Some embodiments of the invention may also, or alternatively, provide methods or systems for filling a mobile media player with media items. In some embodiments, the auto-fill operation may be automatically performed at a designated time and/or before a significant event, such as at the beginning of the day or before a trip. The new media items loaded on the device may be selected to be responsive to the user's taste preferences, in some cases as influenced by the anticipated event. The new media items may also be selected, and current items on the device deleted, based in part on merging user taste data accumulated on the device since the last fill with user historical and community taste data on a system host server.

In one embodiment of a system according to the invention, one or more mobile media players are provided. Each mobile media player is configured to play media items in a media item playlist. A playlist modification component is provided, which may be configured to receive a media item playlist from a given user's mobile media player, analyze user taste data associated with the mobile media player, and modify the media item playlist using the user taste data. A network transmission component may also be provided to transfer media items to the mobile media player and delete media items from the mobile media player in accordance with the modified media item playlist. If desired, the modified media item playlist may also be downloaded to the mobile media player.

The playlist modification component may also be configured to rank the media items in the media item playlist according to the user taste data analysis. In such embodiments, the network transmission component may also be configured to delete media items from the mobile media player according to a similar ranking. The playlist modification component may also comprise a playlist builder configured to build one or more playlists from the user taste data. The playlist builder may be configured to rank the media items in at least one playlist from the user taste data. When the media items in a playlist are so ranked, the network transmission component may be configured to download media items to the mobile media player according to their ranking. The system may therefore rank media items for deletion and/or for addition to a mobile media player.

In some embodiments, the playlist modification component may further be configured to compare the user taste data with user taste data from a previous session to identify changed user taste data. The playlist modification component may then modify the media item playlist using the changed user taste data.

In one embodiment of a method according to the invention, a media item playlist is received from a mobile media player. User taste data associated with a user of the mobile media player may also be received and analyzed. A recommended playlist may then be generated from the analysis of the user taste data. The recommended playlist may then be compared with the media item playlist and modified using the comparison with the media item playlist. This comparison and modification may involve, for example, removing media items from the recommended playlist that are already on the media item playlist. The media items in the recommended playlist, or a subset of the media items in the recommended playlist, may then be ranked. This ranking may comprise the order in which the media items are to be ultimately transferred to the mobile media player. Of course, this does not necessarily mean that all of the items in the ranked list must be transferred. Indeed, space constraints, special user demands, etc., may dictate that less than all of the ranked media items be transferred. Media items in the media item playlist may also be ranked in the order in which they are to be removed from the mobile media player. However, again, this does not require that all ranked items be removed. One or more media items may then be deleted from the mobile media player in an order according to their rankings, and one or more media items may be transferred to the mobile media player in an order according to their rankings.

The media item playlist may also be modified to reflect the media items removed from the mobile media player and the media items transferred to the mobile media player. The modified media item playlist may then also be transferred to the mobile media player.

As used herein, a "user recommender" is a module integrated in a community of users, the main function of which is to recommend users to other users in that community. There may be a set of items in the community for the users of the community to interact with. There may also be an item recommender to recommend other items to the users. Examples of recommender systems that may be used in connection with the embodiments set forth herein are described in U.S. patent application Ser. No. 11/346,818 titled "Recommender System for Identifying a New Set of Media Items Responsive to an Input Set of Media Items and Knowledge Base Metrics," and U.S. patent application Ser. No. 11/048,950 titled "Dynamic Identification of a New Set of Media Items Responsive to an Input Mediaset," both of which are hereby incorporated by reference.

As used herein, the term "media data item" is intended to encompass any media item or representation of a media item. A "media item" is intended to encompass any type of media file which can be represented in a digital media format, such as a song, movie, picture, e-book, newspaper, segment of a TV/radio program, game, etc. Thus, it is intended that the term "media data item" encompass, for example, playable media item files (e.g., an MP3 file), as well as metadata that identifies a playable media file (e.g., metadata that identifies an MP3 file). It should therefore be apparent that in any embodiment providing a process, step, or system using "media items," that process, step, or system may instead use a representation of a media item (such as metadata), and vice versa.

Examples of processes and systems for the automated removal of media items from a mobile media player will now be discussed in greater detail. Typically, the memory available for storing media items on a mobile media player is a limited resource which must be managed. When loading new media items, a user must frequently decide whether to overwrite, or otherwise remove, media items currently stored on the device to make room for new media items. The process for loading new media items can be expedited and simplified for a user if each of the media items on a device, or a subset of the media items on a device, can be automatically ranked according to current user interest in retaining them. Given the ranking, existing items can be automatically deleted from least desirable to most desirable until either the amount of required space, or a threshold of desirability, is reached. The freed space is then available for loading new media items. Examples of processes and systems for automatically adding media items to a mobile media player will be discussed infra.

Examples of methods for inferring free space based on statistical regression are described herein. An example regression model for attaching a probability of deletion to each item in the device will be introduced. An example method for estimating the parameters of the model responsive to user preferences will then be outlined. Finally, example deterministic and random schemes for deleting items using the statistical regression values will be described.

Inferring "free space" on a mobile device by statistical regression:

Assume the total space available for storing media items on a mobile device is $S_T$ bytes and that the device memory currently includes items $m_1, m_2, \ldots, m_N$ requiring space:

$$S_U = s(m_1) + s(m_2) + \ldots + s(m_N)$$

The task is to determine which items $m_{i1}, m_{i2}, \ldots, m_{iL}$ to discard, the space used by the remaining items $$S_R = s(m_1) + \ldots + s(M_{i1}-1) + s(M_{i1}+1) + \ldots + s(M_{i2}-1) + s(M_{i2}+1) + \ldots$$

and the resulting free space $$S_F = S_T - S_R$$

available for new items.

Generalized Linear Regression Model:

One approach to doing this uses standard statistical regression with a generalized linear model. The decision to delete an item is represented as a binary random variable y, such that a sample instance "$y_i=1$" means delete item $m_i$ and "$y_i=0$" means retain item $m_i$. We assume that the value of y is predicted by a vector of measurable covariates $X=[x_1, x_2, \ldots, x_K]$, which need not be binary.

The covariates X predict y probabilistically. That is, $$Pr\{y=1|X=[x_1, x_2, \ldots, x_K]\} = F(\beta_0 x_0 + \beta_1 x_1 + \beta_2 x_2 + \ldots + \beta_K x_K) = F(\beta X)$$

where we assume $x_0=1$ for notational convenience and $F(x)$ is a monotonic increasing function that ranges from $F(-\infty)=0$ to $F(\infty)=1$. The covariates X can be any measurable properties of the items reflecting user taste that increase or decrease the probability of deleting an item.

Remembering y is a binary random variable, it can be shown that $$E\{y|X,\beta\} = 1 * Pr\{y=1|X,\beta\} + 0 * Pr\{y=0|X,\beta\} = F(\beta X).$$

This is mathematically equivalent to saying that the random variable y is described by the equation $$y = F(\beta X) + \epsilon$$

where $\epsilon$ is a random variable with cumulative distribution $F(y)$.

Multinomial Generalization of the Linear Model:

The basic linear model can be further extended into a linear model in nonlinear functions of the covariates by simply replacing the covariate vector X by a new nonlinear covariate vector $$X' = [g1(X), g2(X), \ldots, gL(X)] = G(X)$$

in the general formulation of the model, so that $$y = F(\beta G(X)) + \epsilon.$$

This nonlinear model can be much harder to solve if one seeks to find an optimal multinomial function G(X) rather than just the parameter vector $\beta$. The R computational environment supports this nonlinear extension in the generalized linear model solver, where G(X) is a vector multinomial function.

Estimating Model Parameters:

In the most common case, we don't know the vector $\beta$ of model parameters a priori, but must instead derive an estimate $\beta'$ given a set of examples $(y_1, x_1), (y_2, X_2), \ldots, (y_N, X_N)$, N>>M. Typically, this is done using maximum likelihood methods, which incorporate specific mathematical techniques to deal with certain details that arise in real applications. However, it may be unlikely in the present application that there will be a set of examples $(y_1, x_1), (y_2, X_2), \ldots, (y_N, X_N)$ we can use to derive an estimate for the parameter vector $\beta' = [\beta'_1, \beta'_2, \ldots, \beta'_k]$. Instead, one must either specify ad hoc values for $\beta$ or use alternative methods for producing these values. One practical method is to quantify informal logical rules for retaining or deleting items.

Arithmetization of Logical Expressions:

One simple approach is to assume that the variables X are values for a set of metrics X which can be computed for each media item and that we have a logical function $\Gamma(X)$ which informally describes the rules in terms of the metrics for deciding whether an item should be retained or deleted. Using the standard methods of Boolean algebra, we can reduce $\Gamma(X)$ to a "sum-of-products" logical form:

$$\Gamma(x) = z_1(x) \vee z_2(X) \vee \ldots \vee z_k(X)$$

where each $z_i(X)$ is a conjunction of some subset of the metrics X, e.g.:

$$z_i(X) = x_2 \wedge x_5 \wedge x_7$$

We can translate the Boolean function $\Gamma(X)$ to a weighted multinomial function in the values X of the metrics X $$\beta G(X) = \beta_1 z_1 + \beta_2 z_2 + \ldots + \beta_k z_k - \frac{1}{2}$$

where each $z_i$ is the product of the values of the metrics in the corresponding conjunction $z_i$, e.g.:

$$z_i(X) = x_2 x_5 x_7$$

There are various ways for choosing the values $\beta_i$ for this translation of the Boolean function $\Gamma(X)$. One way, if we assume that each $x_i$ is a bounded, non-negative quantity, is to let each $\beta_i$ be the reciprocal of the product of the upper bounds of the value for the metrics in the corresponding product, e.g.:

$$\beta_i = 1/[sup(x_2) sup(x_5) sup(x_7)]$$

This monotonic model can be extended to include negated logical variables $\neg x_i$ by representing the metric value for a negated logical variable as $$\sim x_i = sup(x_i) - x_i$$

Some Example Metrics:

As developed here, the model can include as a component any metric which is predictive of whether an item should be retained or deleted. One class of predictive covariates are popularity metrics including:

1) The total number of plays p(t) at any point in time, perhaps normalized by the total expected number of plays P, (i.e., p(t)/P).

2) The recent rate of plays $r(t) = [p(t) - p(t-\Delta t)]/\Delta t$.

3) The recent rate of skips $s(t) = [q(t) - q(t-\Delta t)]/\Delta t$, where q(t) is the number of times the listener has prematurely terminated playback of the item.

Another class of predictive covariates are based on the similarity between an item i and some candidate new items $j_1, j_2, \ldots, j_m$. One type of similarity metric is based on metadata. Suppose we have a set of l metadata items (e.g., genre, year, label) for each item and we denote the values of the metadata items for item i as $m_{1i}, m_{2i}, m_{li}$. We can define the meta-data similarity between items i and j as $$\eta(i,j) = msim(m_{1i}, m_{1j}) + msim(m_{2i}, m_{2j}) + \ldots + msim(m_{li}, m_{lj})$$

where the function $msim(m_{1i}, m_{1j})$ evaluates to "1" if $m_{1i}$ and $m_{1j}$ are considered to be similar and "0" otherwise. Given the item i and some candidate new items $j_1, j_2, \ldots, j_m$, we can use as another component of the model:

4) The q-mean metadata similarity $\eta(i) = \{[\eta(i, j_1)^q + \eta(i, j_2)^q + \ldots + \eta(i, j_l)^q]/l\}^{1/q}$ Note that for $q=1$, $q \to 0$, $q=-1$, and $q \to \infty$, the q-mean reduces to the arithmetic mean, geometric mean, harmonic mean, and maximum (norm), respectively. Furthermore, one could also take the minimum of the $\eta(i, j_l)$ as a similarity metric.

In addition to metadata similarity, in those cases where we have an independent similarity measure $0 \leq \mu(i,j) \leq 1$ between items i and j, we can define 5) The q-mean relational similarity $\mu(i) = \{[\mu(i, j_1)^q + \ldots + \mu(i, j_l)^q]/l\}^{1/q}$ Finally, if we let U(i,j) denote the vector of similarities $\mu(i, l)$, $l \neq i, j$ for item i, we can define the cosine similarity between U(i,j) and U(j,i) as $$\rho(i,j) = \langle U(i,j), U(j,i) \rangle / \|U(i,j)\| \|U(j,i)\|$$

In some cases, one may want to include only the component similarities $\mu(i, l)$ for the new items $j_1, j_2, \ldots, j_m$ in the similarity vectors U(i,j) and U(j,i). Using these component similarities $\rho(i,j)$ we can define 6) The q-mean cosine similarity $\rho(i) = \{[\rho(i, j_1)^q + \rho(i, j_2)^q + \ldots \rho(i, j_2)^q + \ldots + \rho(i, j_l)^q]/l\}^{1/q}$ Other metrics, and techniques for combining measurable metrics on an item into a probability value, including those involving the arithmetization of a logical function $\Gamma(X)$ which informally describes whether an item should be retained or deleted, are also within the spirit of the method for deducing the probability that an item should be retained or deleted, as described herein.

Item Deletion Methods:

Once we have a coefficient vector $\beta$, we can determine which items to delete in one of two ways:

Deterministic Deletion:

In the deterministic approach, the actual decision d, whether to delete item $m_1$ is determined by the predicted $E\{y_i | X_i, \beta\} = F(\beta X_i)$ as $$d_i = \begin{cases} 1 & \text{user specifies that item should be deleted} \\ 0 & \text{user specifies that item should be retained} \\ 1 & \text{if } E\{y_i | X_i, \beta\} > B \text{ otherwise} \end{cases}$$

where $X_i$ is the vector of measured factors for item $m_i$, and the threshold $0 \leq B \leq 1$ is a threshold of desirability for retaining items, or is selected such that the resulting free space $S_f$ is large enough to meet whatever other space requirements that might be externally imposed.

Random Deletion

The random approach uses the binary random variable y, directly. That is, the decision $d_i$ to delete item $m_1$ is the random variable $$d_i = \begin{cases} 1 & \text{user specifies that item should be deleted} \\ 0 & \text{user specifies that item should be retained} \\ y_i & \text{otherwise} \end{cases}$$

where $\Pr\{y_i=1/X_i\}=F(\beta X_i)$. Given $F(\beta X_i)$, standard computational techniques can be used to generate sample instances of a binary random variable $y_i$ with the required binary distribution $\Pr\{y_i=1\}$ and $\Pr\{y_i=0\}$.

Because deletion is a random process, the amount of resulting free space $S_f$ also is a random variable in this approach. Meeting a desired objective for the resulting amount of free space $S_f \geq S_f$ can be more complex than for the deterministic approach. This may be handled by generating a vector of sample instances $$Y^{(n)}=[y_1, y_2, \ldots, y_N],$$

doing the indicated deletions, and evaluating the resulting free space $S_f$. The process may then be repeated as necessary until the requirement $S_f \geq S_f$ is met. Alternatively, one could sequentially generate vectors of sample instances $Y^{(1)}$, $Y^{(2)}$, ... not doing deletions, until the deletions specified by the particular instance $Y^{(m)}$ result in enough free space to meet the requirement $S_f \geq S_f$.

Described above are illustrative methods and systems for intelligently deleting media items on a mobile player device based on user taste preferences to free storage space on the device for new media items. Some embodiments use predictive covariates $X_i=[x_1, x_2, \ldots, x_K]$, which are metrics for the user taste preferences, to arrive at a probabilistic decision $y_i$ as to whether each media item $m_i$ on the device should be deleted. The covariates $X_i$ can include metrics of local taste data uploaded from the mobile player to the system host, as well as community taste measures gathered and maintained by the system host from a community of users. Similarly, the method could be incorporated in the mobile device and driven by metrics supplied to it by the system host, or reside on the system host and the final deletion decision transmitted to the mobile device.

An example of a method for automatic deletion of media items from a mobile media player is shown in the flowchart of FIG. 1. As shown in the figure, media item play data is recorded in a portable media player in step 502. A user then makes a request to download new media items and/or create free space on the device in step 504. The media items on the device are then ranked based upon assigned probability values, as indicated at 506. The process of deleting items then begins at 508, starting from the highest (or lowest, depending upon how the ranking is structured) ranked media item on the list. Once a media item has been deleted, the system may check to see if a threshold value has been reached at 512. If the threshold value has been reached, the sequence terminates. If not, a check is made as to whether the requested space on the device has been made available, as indicated at 510. If the requested space is not yet free, the next item on the list is deleted. If so, the sequence terminates.

Figure 2:
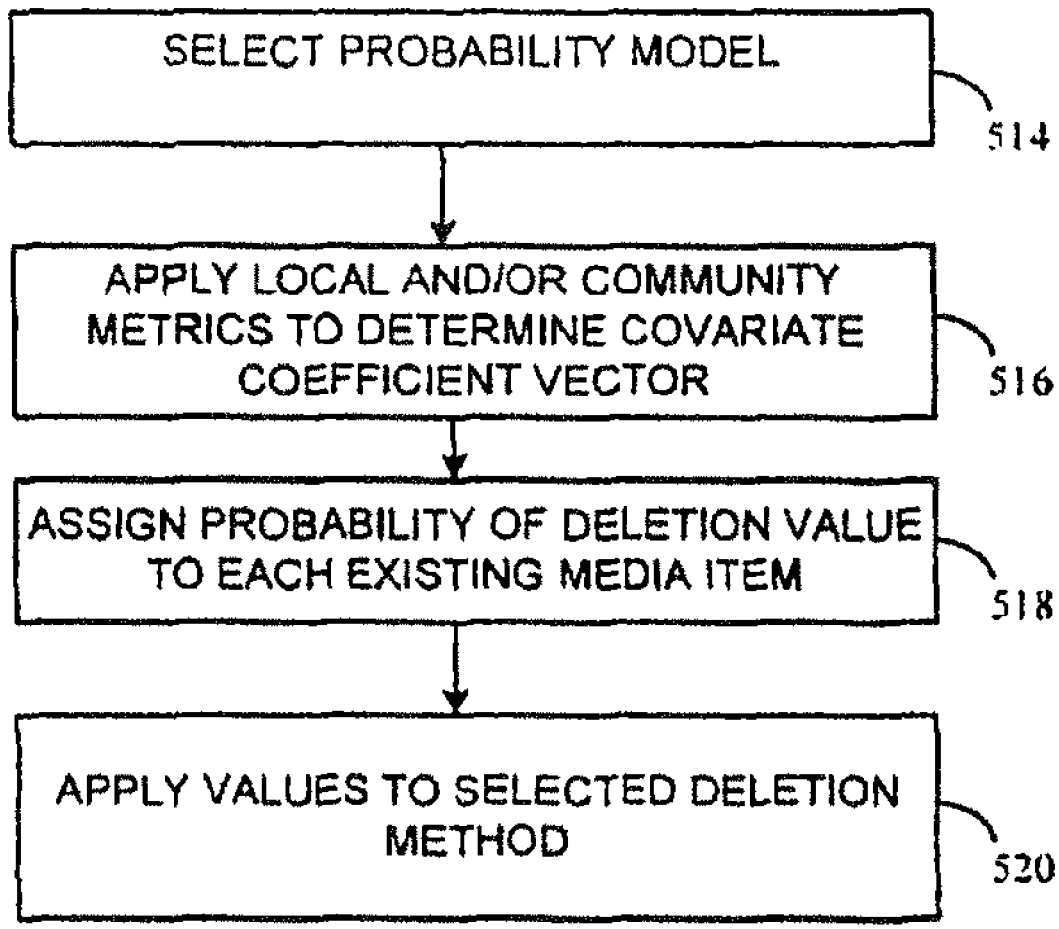
FIG. 2 is a flowchart of one implementation of a probability computation process.

An example of a probability computation process is shown in the flowchart of FIG. 2. As shown in the figure, a probability model is selected at 514. Then, local and/or community metrics are applied to determine a covariate coefficient vector, as indicated at 516. A probability of deletion value is then assigned to each media item on the portable media player at 518. The deletion values are then applied to the deletion method, as previously described, at 520.

Figure 3:
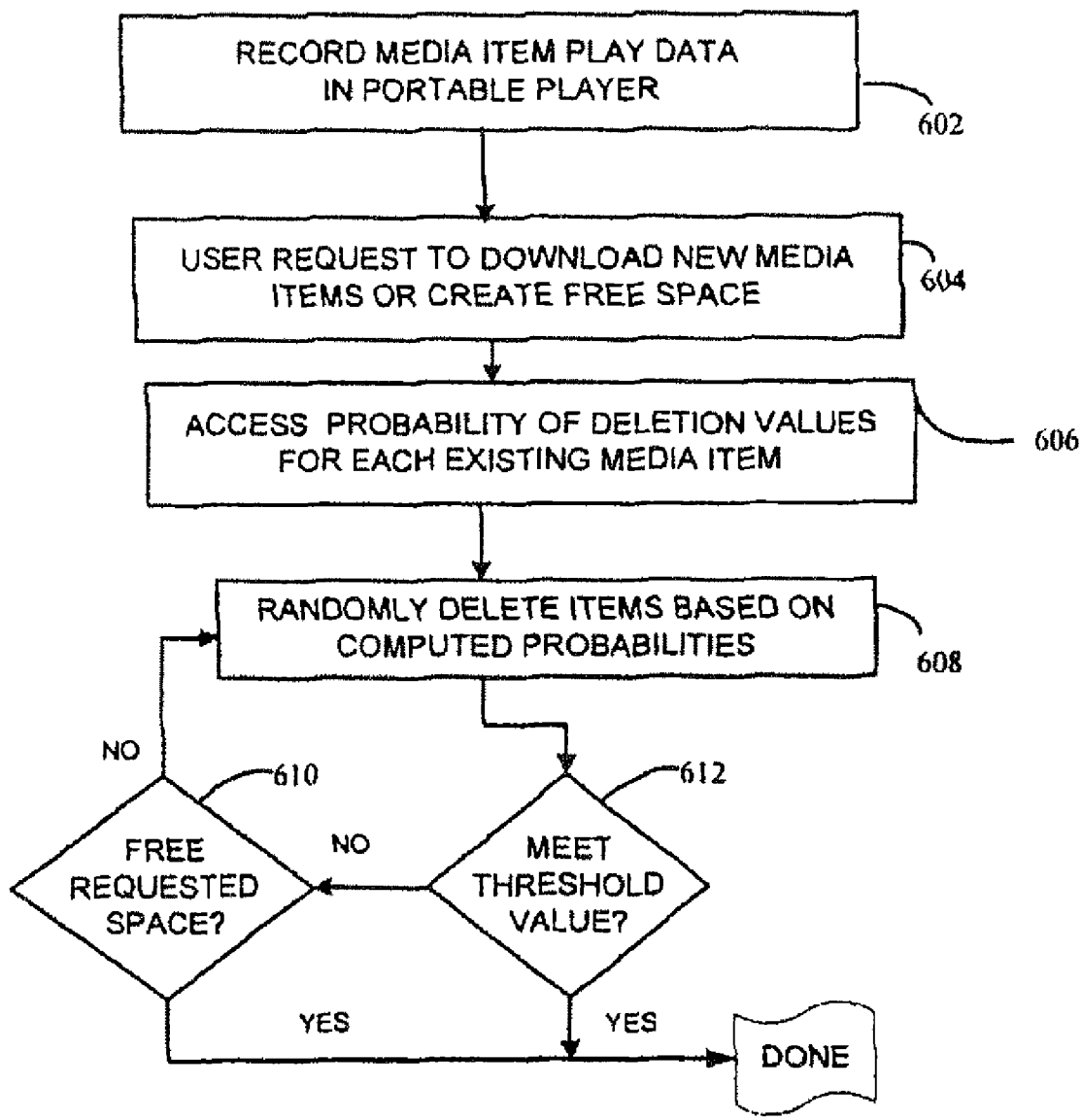
FIG. 3 is a flowchart of another embodiment of a method for the automated deletion of media items from a portable media player.

Another example of a method for automatic deletion of media items from a mobile media player is shown in the flowchart of FIG. 3. As shown in the figure, media item play data is recorded in a portable media player in step 602. A user then makes a request to download new media items and/or create free space on the device in step 604. Probability values for deletion of each of the media items, or a subset of the media items, on the portable media player are then accessed at 606. The process of randomly deleting items based upon the computed probabilities then begins at 608. Once a media item has been deleted, the system may check to see if a threshold value has been reached at 612. If the threshold value has been reached, the sequence terminates. If not, a check is made as to whether the requested space on the device has been made available, as indicated at 610. If the requested space is not yet free, the next item on the list is deleted. If so, the sequence terminates.

Methods for auto-filling a mobile media player will now also be described in greater detail. In one embodiment, a plurality of portable media players each have access to a central server or the like. Each user may initially obtain and install software on a local computer. Each user may also provide taste data to the server.

After the initialization phase described above, a user can establish communication between the host server and his or her media player, typically by connecting the media player with a computer networked to access the host server. The user can then issue a "start" command to start the auto-fill process. Alternatively, the system may be configured to automatically start the process upon being connected with a media player. In some versions, this step can also include retrieval of local user taste data, such as play counts, play sequences, media item ratings, etc., from the mobile device. Still other examples of user taste data are set forth elsewhere in this disclosure.

In some versions, a list of the media items currently on the mobile device may also be transferred to the host server. The host server may then supply the user taste data to an independent playlist-builder system, which may use any retrieved user taste data, historical user taste data, and/or the list of the media items from the mobile device to provide the host server with playlists of media items responsive to the user's taste preferences. These playlists may comprise media items in any media libraries available to the user and known to the playlist-builder system. Typically, these libraries will include the media items licensed to the user and stored on the server for access by the user.

Once the host server has been supplied with the playlists, the host server may retrieve a list of the media items currently on the mobile device (if this list wasn't previously retrieved). The list of new media items to be loaded onto the device is then reconciled with the list of media items currently on the device to determine how much space must be freed on the device to accommodate the new media items and which media items should be deleted. The media items selected for removal are then deleted and the new media items are loaded onto the device.

Although the foregoing steps can be performed repetitively ad infinitum without further explicit user intervention, at times the user may want to adjust user preferences to change the auto-fill behavior. For example, a user may wish to provide special user instructions, such as instructions to mark certain media items stored in the device as "do not delete" or "always delete." Alternatively, a user may wish to provide additional user taste data associating user tastes with a specific activity, such as data in the form of requesting that a selection of media items or a genre of media items be for "running," "dinner," or "work." As still another example, a user may wish to provide temporal user taste data associating a selection of media items or a genre of media items with an upcoming date or event.

As indicated previously, some embodiments of the system may be configured to assume that the host server has access to a playlist-builder system which automatically generates playlists based on user-supplied preferences in response to a query by the host server. Some examples of such systems known to those skilled in the art include U.S. Pat. Nos. 6,993,532 titled "Auto Playlist Generator" and 6,526,411 titled "System and Method for Creating Dynamic Playlists." Additional examples can be found in U.S. Patent Application Publication Nos. 2002/0082901 titled "Relationship Discovery Engine," 2003/0221541 titled "Auto Playlist Generation with Multiple Seed Songs," and 2005/0235811 titled "Systems for and Methods of Selection, Characterization and Automated Sequencing of Media Content." Each of the foregoing patents and published patent applications are hereby incorporated by reference. In preferred embodiments, the playlist builder will accept user taste data in multiple forms, such as one or more of the following:

1. Tags—Tags are pieces of information separate from, but related to, an object. In the practice of collaborative categorization using freely chosen keywords, tags are descriptors that individuals assign to objects.

2. Media items or media item lists—Lists of tracks, movies, etc. that are of the same type as the items to be transferred to the portable device.

3. Special item lists—For example, items the user explicitly bans, items an intelligent system using user feedback implicitly bans, items the user explicitly requests to be on the device.

4. Meta-data—Text-based data that is regularly associated with an item to classify it (e.g., genre, year, purchase date).

5. Ratings—User-defined value judging the quality of the item.

6. Events—Temporal-based features which can be inferred from a calendar (e.g., a Yahoo® calendar).

7. Serendipity—User-defined value indicating the user's preference of non-popular content in their play stream.

8. Plays model—A model of the item play behavior of the user, such as the number of times a user plays a media item before becoming tired of it, the user's expected playcount profile for an item across time, and/or percentage of a playlist or media item a user plays before switching to another.

9. Play Stream—Time-stamped record of media player interaction, including statistics, such as items played to completion, skipped, re-started, and/or deleted.

10. Play count—Number of times a media item has been played over a given period of time.

11. Temporal Data—Preferences implicitly or explicitly associated with a time instance or event, such as time of day or day of the week.

12. Subscribed influences—User-defined external taste inputs which help define the desired experience (e.g., friends' tastes, media items defined by an expert such as a DJ, etc.).

13. Ambient noise—User environment noise level sensed by the device.

14. Discovery value—User-defined value for indicating the media items never played by the user that may be introduced into the media consumption experience.

15. Re-discovery value—User-defined value for indicating the media items that the user has not played recently, which may be introduced into the media consumption experience.

Figure 4:
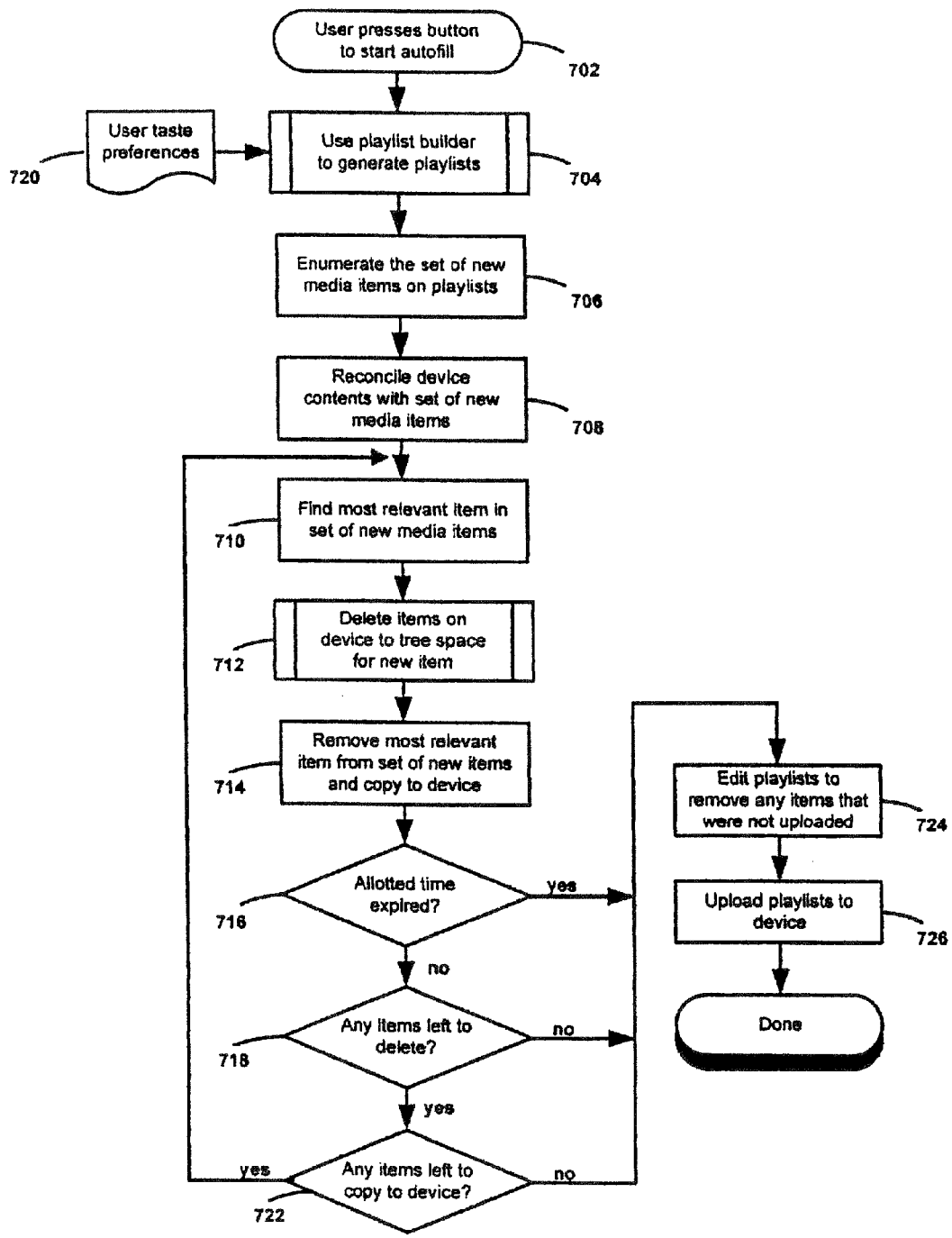
FIG. 4 is a flowchart of one embodiment of a method for the automated deletion of media items from a portable media player and selection and addition of new media items to the player.

Given one or more playlists generated by a playlist-builder system in response to a query, the host server may then determine the set of media items included in those playlists and execute an auto-fill process, an example of which is depicted in FIG. 4. Initiation 702 of the auto-fill process may be in response to a single user action, such as connecting the mobile device to the host server, or the receipt of an explicit "start" indication from the user. A playlist builder may then receive user taste data 720 and use the data to generate one or more playlists, as indicated at 704.

Once the playlist(s) have been provided, the host server can enumerate 706 the set of media items on those playlists and then reconcile 708 that set of media items with the set of media items currently on the device. The host may determine which of the new media items are already on the device and remove them from the list of items to be loaded. In some embodiments, these media items may also be removed from consideration for deletion. The host server may then use a method to effectively rank the media items on the device as to the probability they should be deleted based on how compatible they are with the user taste data supplied to the playlist builder system. This ranking may then be used to select the media items to be loaded onto the device. The host server may also rank the media items in an analogous way as to the probability they should be deleted from the player.

Using the ranking information for the new media items, the host server may, as shown at 710, select the item with the highest probability it should be loaded from the list of new media items. Items may then be deleted 712 from the media player until enough space is available for the most compatible of the new items using the method described below, after which media items are loaded 714 onto the media player. This process of selecting 710, deleting 712, and loading 714 is repeated until, for example, the available time for the auto-fill operation has expired, as indicated at 716, all items on the device have been deleted, as indicated at 718, or the entire new set of media items has been loaded onto the device, as indicated at 722. Alternatively, in circumstances where there is no time limit on the load process, the deletion process 712 may delete enough items from the device to free enough space to load as many of the new items as the device capacity, or a preselected number of items, will accommodate. A user may also dictate that a particular subset of memory be used for new items and free that amount of space. The loading process 714 may then load as many of the new media items as the available space on the device permits in a single operation.

Finally, for media players which also accept downloads of playlists, the playlist(s) may be edited to remove any new items which could not be loaded and then the playlist(s) loaded onto the device, as indicated at 724 and 726, respectively.

In some embodiments, media items may be randomly chosen and deleted to free enough storage space on the media player to accommodate the new media items. In other embodiments, the media items currently on the player may be ranked in terms of how compatible they are with the criteria used to generate the playlists of new media items to be loaded on the device. These media items may then be preferentially deleted based on that ranking. The same process can also be applied to the playlist items to provide an inverse ranking of the new media items to cause the most desirable items to be loaded first. In this way, the most desirable subset of new items will be loaded in the event that the entire set of new media items cannot be loaded due to, for example, time or space limitations.

As previously described, a statistical method for inferring which media items on the player should be deleted based on metrics of user taste preferences may be applied. The method may model the conditional probability of the binary decision y that an item should be deleted (y=1) in terms of a the computed value X for an n-vector of item metrics X:

$$Pr\{y=1|X=[x_1, x_2, \ldots, x_K]\}=F(\beta G(X))$$

where G(X) is an m-vector of non-linear functions of the metrics and β is a vector of m weighting values for linearly combining the components of G(X) into a scalar value. The component functions G(X) are from a particular class of function such the decision variable y has a particular type of generalized linear model $$y=F(\beta G(X))+\epsilon$$

where F(x) is a monotonic, non-decreasing "link" function that maps $(-\infty, \infty)$ into the interval (0,1), and $\epsilon$ is a zero-mean random variable that is assumed to have a relevant distribution (although the auto-deletion process operates oblivious to the distribution of $\epsilon$).

Given a specified F(x), β, and G(X), the host server ranks the media items on the player which are candidates for deletion and the new items to be loaded by first computing F(βG(X)) for each item in both sets. A common choice of F(x) is the logistic function $$F(x)=1/(1+e^{-x})$$

It should be appreciated that since F(x) is a monotonic, non-decreasing function, the items can be ranked by the computed values F(βG(X)), with the values βG(X) used as first round tie-breakers when the values F(βG(X)) for two items are identical and the values of βG(X) for those items differ. When the F(βG(X)) and the values of βG(X) both agree for the two items, any preferred method can be used to rank one before the other, including a random choice. In this way, the ranking of the media items in a set by values of F(βG(X)) is seen to be identical to the ranking of those items by values βG(X), the latter being a ranking linked explicitly to the computed metrics.

Another method for computing the metrics $X=[x_1, \ldots, x_K]$ assumes that the items are to be ranked based on a set of item attributes $a_1, a_2, \ldots, a_K$ such as those described above in the discussion about playlist building, and a set of preference values $p_1, p_2, \ldots, p_K$ that range between 0 (strong preference) and 1 (weak preference). The degree to which an item satisfies attribute $a_k$ may be computed as $$x_k=h(a_k)[100-90p_k]+(1-h(a_k))u(p_k)$$

where $h(a_k)=1$ if the item has attribute $a_k$ and $h(a_k)=0$ otherwise, and $u(p_k)=0$ if $p_k=0$ and $u(p_k)=5$ otherwise. The media items on the device may then be ranked for possible deletion by the values $$\beta G(X)=50k-(x_1+\ldots+x_k)$$

Similarly, the new items may be inverse ranked according to the same values.

The ranking of media items on the device during the reconciliation process 708 establishes the relative probability that items will be deleted. In the deletion process 712, items are actually deleted in a deterministic or probabilistic fashion by, for example, methods described herein. The deterministic and probabilistic methods used for deletion may also be applied to process 712 for selecting items in sequence from the set of new items to increase the diversity of user experiences in repeated auto-filling operations.

The above description fully discloses the invention including preferred embodiments thereof. Without further elaboration, it is believed that one skilled in the art can use the preceding description to utilize the invention to its fullest extent. Therefore the examples and embodiments disclosed herein are to be construed as merely illustrative and not a limitation of the scope of the present invention in any way.

It will be obvious to those having skill in the art that many changes may be made to the details of the above-described embodiments without departing from the underlying principles of the invention. Therefore, it is to be understood that the invention is not to be limited to the specific embodiments disclosed and that modifications and other embodiments are intended to be included within the scope of the appended claims.

The scope of the present invention should, therefore, be determined only by the following claims.

The invention claimed is:

1. A computer-implemented method for the automated selection and loading of media items from a computer into a portable media presentation device, the method comprising:
    at the time of initiating the removal and loading process, accessing a media item current playlist associated with the portable media presentation device;
    accessing current user taste data associated with a user of the portable media presentation device, the taste data responsive to recent use of the portable presentation device by the said user;
    generating a recommended playlist responsive to the user taste data;
    ranking the media items in the recommended playlist responsive to the user taste data;
    determining an amount of memory storage space available on the media presentation device for storing new items; and
    automatically removing as many media items from the media presentation device as necessary to free memory space sufficient to accommodate at least the highest ranked one of the ranked media items, wherein the media items are removed from the media presentation device in reaction to the current user's taste data.

2. The method of claim 1 and further comprising:
    selecting a media item from the recommended playlist;
    deleting at least one item on the current playlist from the media presentation device to free memory space as necessary to store the selected media item;
    downloading the selected media item over the network into memory on the media presentation device; and
    repeating said selecting, deleting and downloading steps until a predetermined termination condition is met.

3. The method of claim 2 wherein the termination condition comprises expiration of available time for the auto-fill operation.

4. The method of claim 2 and further comprising:
    repeating said selecting, deleting and downloading steps until at least a predetermined minimum number of the items on the recommended playlist have been downloaded into the media presentation device.

5. The method of claim 2 wherein the media presentation device is portable or installed in a vehicle.

6. The method of claim 2 wherein the selecting and downloading steps include:
    first selecting a highest ranked one of the recommended playlist media items; and
    repeating said downloading step, in descending rank order of the media items, until the amount of memory storage space available on the media presentation device for storing new items is insufficient to add a next one of the recommended playlist media items.

7. The method of claim 2 and further comprising:
    repeating said selecting, deleting and downloading steps until a user-selected amount of memory space is used in the media presentation device for storing new media items downloaded from the recommended playlist.

8. The method of claim 2 wherein removing media items from the current playlist comprises randomly selecting media items for removal.

9. The method of claim 2 wherein removing media items from the current playlist comprises:
ranking the media items in the current playlist based on compatibility with the user taste data used to generate the recommended playlist; and
selecting media items for removal in order of the said ranking, by sequentially removing the least compatible media items first and the most compatible media items last.

10. The method of claim 9, wherein the current user taste data comprises at least one of a metric indicative of the total number of plays for one or more media items in the current media item playlist, a metric indicative of a recent rate of plays for one or more media items in the current media item playlist, and a metric indicative of a recent rate of skips for one or more media items in the current media item playlist.

11. The method of claim 9, wherein said ranking media items in the current media item playlist in an order in which the media items are to be removed from the media presentation device includes ranking the media items stored on the mobile media presentation device according to a probability of deletion from the mobile media presentation device, responsive to implicit current user interest in retaining them, without explicit user input or user selections.

12. The method of claim 11 wherein the implicit user interest for each media item currently stored on the mobile media presentation device is quantified using a linear regression model responsive to a vector of selected covariates, wherein the covariates comprise measurable properties or metrics of the media items reflecting user taste that increase or decrease a probability of deleting the media item.

13. The method of claim 12 wherein the covariates are selected from a first class of metrics comprising 1) a total number of plays $p(t)$ at any point in time, 2) a recent rate of plays $r(t)=[p(t)-p(t-\Delta t]/\Delta t$, and 3) a recent rate of skips $s(t)=[q(t)-q(t-\Delta t]/\Delta t$, where $q(t)$ is the number of times the listener has prematurely terminated playback of the item.

14. The method of claim 13 wherein the number of plays $p(t)$ is normalized relative to a total number of plays P, (i.e., $p(t)/P$).

15. The method of claim 13 wherein the covariates are selected from a second class of metrics responsive to metadata similarity between one of the media items and a set of candidate new items $j_1, j_2, \ldots, j_m$.

16. A computer-implemented method for the automated selection and loading of media items from a computer into a media presentation device, the method comprising:
accessing explicitly specified user preferences associated with a selected media item stored on the media presentation device;
responsive to the user preferences, determining a designated time associated with the selected media item;
comparing the designated time to a current system time;
if the current system time is after the designated time, removing the selected media item from the media presentation device.

17. The method of claim 16 and further comprising:
selecting a new media item; and
automatically adding the selected new media item to the media presentation device.

18. The method of claim 17 and further comprising automatically loading the selected new media item from the computer into the media presentation device for local storage.

19. The method of claim 16 and wherein the user preferences specify a date for removing the selected media item from the media presentation device.

20. The method of claim 16 and further comprising uploading the selected media item for remote storage.

* * * * *